(12) United States Patent
Nagy

(10) Patent No.: US 9,211,622 B2
(45) Date of Patent: Dec. 15, 2015

(54) HAND POWER TOOL HAVING A DRUM-TYPE TOOL CHANGE MAGAZINE

(71) Applicant: Robert Bosch GmbH, Stuttgart (DE)

(72) Inventor: Attila Nagy, Miskolc-Szirma (HU)

(73) Assignee: Robert Bosch GmbH, Stuttgart (DE)

( * ) Notice: Subject to any disclaimer, the term of this patent is extended or adjusted under 35 U.S.C. 154(b) by 255 days.

(21) Appl. No.: 13/677,052

(22) Filed: Nov. 14, 2012

(65) Prior Publication Data

US 2014/0066277 A1  Mar. 6, 2014

(30) Foreign Application Priority Data

Nov. 29, 2011  (DE) .......................... 10 2011 087 297

(51) Int. Cl.
| | | |
|---|---|---|
| *B23Q 3/157* | (2006.01) | |
| *B25F 1/04* | (2006.01) | |
| *B25F 5/02* | (2006.01) | |

(52) U.S. Cl.
CPC .............. *B23Q 3/15766* (2013.01); *B25F 1/04* (2013.01); *B25F 5/029* (2013.01); *Y10T 483/179* (2015.01); *Y10T 483/1755* (2015.01); *Y10T 483/1798* (2015.01); *Y10T 483/1827* (2015.01)

(58) Field of Classification Search
CPC  B23Q 3/15733; B23Q 3/15766; B25F 5/029; Y10T 483/1745; Y10T 483/1755; Y10T 483/1757; Y10T 483/1767; Y10T 483/1769; Y10T 483/1774; Y10T 483/1779; Y10T 483/1783; Y10T 483/179; Y10T 483/1798; Y10T 483/1818; Y10T 483/1827

USPC ........... 483/35, 39, 40, 44, 45, 47, 49, 51, 54, 483/57, 60, 61; 81/57.37, 177.4, 439, 490
See application file for complete search history.

(56) References Cited

U.S. PATENT DOCUMENTS

| 4,604,005 | A | * | 8/1986 | Russ | 408/35 |
|---|---|---|---|---|---|
| 4,976,175 | A | * | 12/1990 | Hung | 81/439 |
| 5,065,498 | A | * | 11/1991 | McKenzie | 408/35 |
| 5,346,453 | A | * | 9/1994 | Rivera-Bottzeck | 408/35 |
| 5,893,685 | A | * | 4/1999 | Olson et al. | 408/35 |
| 7,766,586 | B2 | * | 8/2010 | DeRosa | 409/232 |
| 2009/0298658 | A1 | * | 12/2009 | Yeh | 483/14 |

(Continued)

FOREIGN PATENT DOCUMENTS

| CN | 201055983 Y | * | 5/2008 |
|---|---|---|---|
| DE | 100 13 984 A1 | | 9/2001 |

(Continued)

*Primary Examiner* — Erica E Cadugan
*Assistant Examiner* — Michael Vitale
(74) *Attorney, Agent, or Firm* — Maginot, Moore & Beck LLP

(57) ABSTRACT

A hand power tool includes a tool receiver configured to receive a tool. The tool has an outer polygonal coupling and the tool receiver has an inner receiver including, at least portionally, a rotary driver profile. The tool receiver is provided on an associated tool housing, in which there is a drum-type tool change magazine having at least one tool chamber configured to store the tool. The tool chamber is configured to be aligned so as to be flush with the tool receiver to enable the tool to slide from the tool chamber into the inner receiver or from the inner receiver into the tool chamber. An alignment element is configured to align the outer polygonal coupling as the tool slides from the tool chamber into the inner receiver to enable the outer polygonal coupling to slide into the rotary driver profile.

6 Claims, 5 Drawing Sheets

(56) References Cited

U.S. PATENT DOCUMENTS

2010/0279839 A1* 11/2010 Moser et al. .................. 483/36
2013/0337985 A1* 12/2013 Nagy .............................. 483/16

FOREIGN PATENT DOCUMENTS

| DE | 10 2006 059 688 A1 | 6/2008 |
| DE | 10 2011 086 290 A1 | 5/2012 |

* cited by examiner

HAND POWER TOOL HAVING A DRUM-TYPE TOOL CHANGE MAGAZINE

This application claims priority under 35 U.S.C. §119 to patent application no. DE 10 2011 087 297.3, filed on Nov. 29, 2011 in Germany, the disclosure of which is incorporated herein by reference in its entirety.

BACKGROUND

The disclosure relates to a hand power tool having a tool receiver, which is configured to receive a tool provided with an outer polygonal coupling and which has an inner receiver configured, at least portionally, with a rotary driver profile, and which is provided on an associated tool housing, in which there is disposed a drum-type tool change magazine having at least one tool chamber for storing the tool, which tool chamber can be aligned so as to be flush with the tool receiver, to enable the tool to be slid over from the tool chamber into the inner receiver or from the inner receiver into the tool chamber.

DE 10 2006 059 688 A1 discloses such a hand power tool, which has a tool change magazine that is mounted in a rotationally movable manner in an associated tool housing and that is provided with a multiplicity of tool chambers provided with differing tools and that can be turned, about an associated rotation axis, into differing tool change positions. In these tool change positions, respectively one of the tool chambers is aligned so as to be flush with an associated tool receiver, such that a tool disposed in the tool chamber can be slid over into the tool receiver and back out of the tool receiver, into the tool change magazine, by means of a rod-shaped slide-over element displaceably disposed in the tool housing.

A disadvantage of the prior art is that the tool, for example provided with an outer polygonal coupling, can become skewed while being slid over from the tool chamber into the tool receiver provided, for example, with an inner polygonal receiver. This can result in a blockage and/or damage to the hand power tool.

BRIEF SUMMARY OF THE INVENTION

It is therefore an object of the disclosure to provide a new hand power tool having a drum-type tool change magazine, with which it is made possible for a tool to be slid over, out of a corresponding tool chamber, into an associated tool receiver in an operationally safe manner.

This problem is solved by a hand power tool having a tool receiver, which is realized to receive a tool provided with an outer polygonal coupling and which has an inner receiver provided, at least portionally, with a rotary driver profile, and which is provided on an associated tool housing, in which there is disposed a drum-type tool change magazine having at least one tool chamber for storing the tool, which tool chamber can be aligned so as to be flush with the tool receiver, to enable the tool to be slid over from the tool chamber into the inner receiver or from the inner receiver into the tool chamber. An alignment element is provided for aligning the outer polygonal coupling as the tool is slid over from the tool chamber into the inner receiver, to enable the outer polygonal coupling to be slid into the rotary driver profile of the inner receiver.

The disclosure thus makes it possible to provide a hand power tool having a drum-type tool change magazine and a tool receiver, with which, during slide over, skewing of an outer polygonal coupling of a tool that is to be slid over out of the tool change magazine into the tool receiver can be prevented in a safe and reliable manner.

According to one embodiment, the alignment element is realized to turn the tool, about its longitudinal axis, into a rotary position in which the outer polygonal coupling and the rotary driver profile of the inner receiver are disposed in an at least substantially congruent manner.

It is thus made possible to provide a hand power tool with which, as the tool is slid over from the tool chamber into the inner receiver, the outer polygonal coupling can easily be slid into the rotary driver profile of the inner receiver.

The alignment element preferably has a spring element, which is realized to apply an associated spring force to the outer polygonal coupling, for the purpose of alignment.

It is thus made possible to provide an uncomplicated and inexpensive alignment element.

The spring element is preferably a hoop spring.

It is thus made possible to provide a stable and robust spring element.

According to one embodiment, the tool receiver has at least one radial opening, in which the spring element engages, at least portionally.

The disclosure thus makes it possible to provide a hand power tool having an alignment element that can easily be coupled to an associated tool receiver.

The radial opening is preferably configured to enable the spring element to access the outer polygonal coupling.

A spring force to be exerted by the spring element for the purpose of aligning the tool can thus be transmitted to the outer polygonal coupling of the latter in a safe and reliable manner.

Preferably, the spring element has at least one spring arm, which engages, at least portionally, in the radial opening.

It is thus made possible for the spring element to be coupled to an associated tool receiver in a simple, uncomplicated manner.

The at least one spring arm is preferably configured to apply a radially inwardly directed spring force to the outer polygonal coupling in the inner receiver of the tool receiver.

It is thus made possible for force to be transmitted in an efficient and effective manner.

According to one embodiment, the spring element has at least one first and one second spring arm, which are connected to each other via a connecting arm and which can be bent in mutually opposite directions as a result of an elastic deformation of the connecting arm.

The disclosure thus makes it possible to provide a simple and robust alignment element.

Preferably, when the spring element is in the non-bent state, the first and the second spring arm are spaced apart from each other by a spacing that corresponds at least to a spacing between two opposing side faces of the outer polygonal coupling.

It is thus easy to ensure a reliable and operationally safe functionality of the alignment element.

BRIEF DESCRIPTION OF THE DRAWINGS

The disclosure is described more fully in the following description with reference to exemplary embodiments represented in the drawings, wherein.

DETAILED DESCRIPTION

Figure 1:
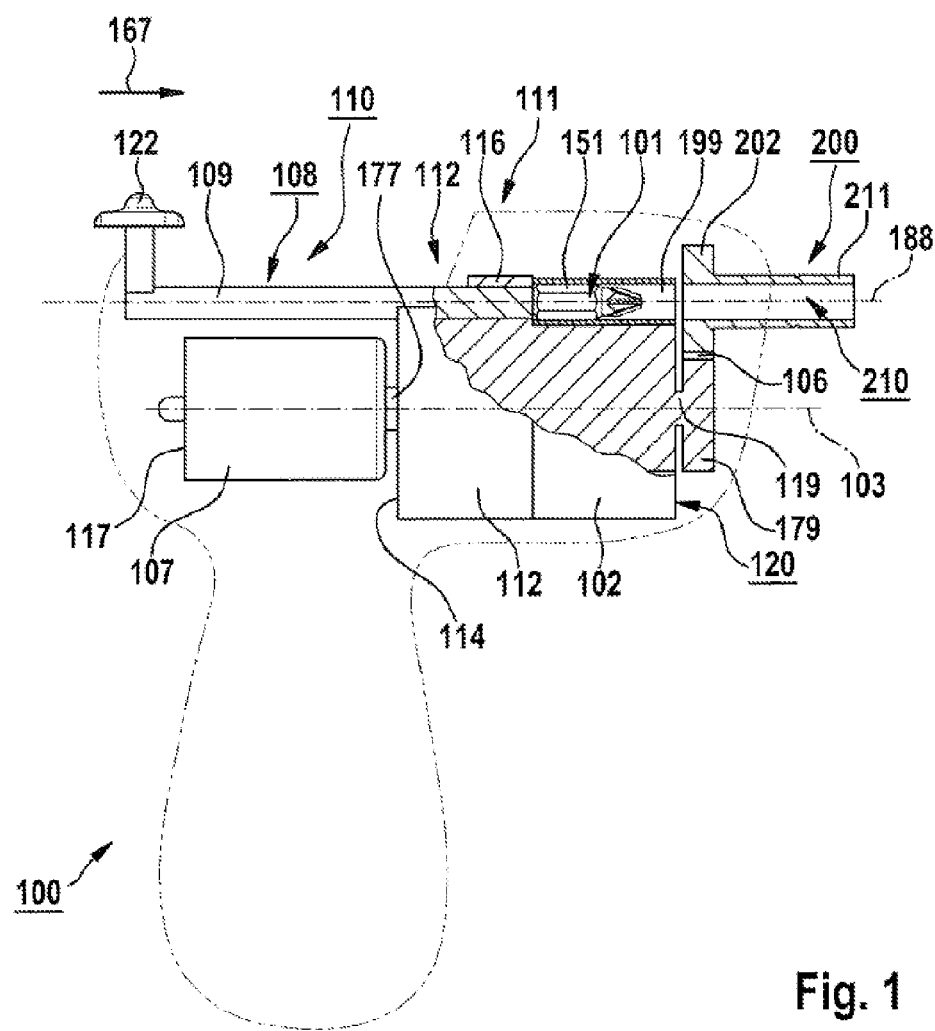
FIG. 1 shows a schematic, partially sectional side view of a hand power tool having a drum-type tool change magazine and a tool receiver according to one embodiment.

FIG. 1 shows, exemplarily, a power tool 100, which can be hand-held and driven by a motor, and which is referred to in the following as a "hand power tool" and which has a tool housing 111, in which a drum-type tool change magazine 120 is disposed so as to be rotatable about a rotation axis 103. The drum-type tool change magazine 120 is realized, exemplarily, in the form of a hollow cylinder, having a ring-type enclosure body 102, in which a multiplicity of tool chambers are provided. Insert tools, for example, can be disposed in the tool chambers, differing insert tools being provided, for example, in all tool chambers. In order to make the drawing clear and easy to understand, in FIG. 1 only a single tool chamber is indicated, and denoted by the reference 199. Disposed exemplarily in this tool chamber 199 there is an insert tool 101, which is also referred to in the following as the "tool" 101.

The hand power tool 100 is realized, by way of illustration, in the manner of a so-called "bit screwdriver" for handling so-called "screwdriver bits". It is pointed out, however, that the present disclosure is not limited to such bit screwdrivers but, rather, can be applied in the case of all power tools in which a drum-type change magazine that can be rotated about a longitudinal axis can be applied, irrespective of whether screwdriver bits or other change objects are stored in the change magazine or whether the power tool can be hand-held or not.

According to one embodiment, a tool receiver 200, for receiving the tool 101, is disposed on the tool housing 111, which tool receiver can be rotated about an associated longitudinal or rotation axis 188. By way of illustration, for the purpose of driving the tool 101 the tool receiver 200 is coupled, via a transmission toothed-wheel system 106, to an output shaft 119 of a transmission 112 disposed, exemplarily, in a housing 114. For this purpose, by way of illustration, provided on the output shaft 119 there is a driving toothed wheel 179, which acts in the transmission toothed-wheel system 106 in combination with an output toothed wheel 202 provided on the tool receiver 200. The output shaft 119 is made to rotate by, for example, a motor shaft 177 of a drive motor 107, which is coupled to the transmission 112 and which is disposed, exemplarily, in an associated motor housing 117, the motor housing 117 and the transmission housing 114 being disposed and fastened, exemplarily, in the tool housing 111.

By way of illustration, the tool receiver 200 has a tool receiver portion 211 in the form of a hollow cylinder, in which there is realized, exemplarily, an inner receiver 210 provided with a rotary driver profile (212 in FIG. 2), e.g. an inner polygonal profile, into which the tool 101, e.g. provided with a corresponding outer polygonal coupling 151, can be slid, out of the tool chamber 199, for the purpose of connecting to the tool receiver 200 in a rotationally fixed manner. A slide-over mechanism 110 is provided for the purpose of sliding the tool 101 over out of the tool chamber 199 into the inner receiver 210 of the tool receiver 200, and out of the inner receiver 210 into the tool chamber 199. This slide-over mechanism comprises, exemplarily, a slide-over element 108, which is realized, exemplarily, in the manner of a slide rod 109, which can be actuated by means of an actuating element 122 and which is guided, for example, in a guide 116 provided on the transmission housing 114, and whose axial end facing toward the tool 101 is realized, for example, so as to be magnetic, for the purpose of magnetic connection to the tool 101. By way of illustration, the actuating element 122 is axially displaceable in an opening 112 provided on the tool housing 111, parallel to the rotation axis 188 of the tool receiver 200.

In the case of an exemplary tool change of the hand power tool 100, the tool change magazine 120 is turned about the rotation axis 103 into a tool change position, in which, for example, the tool chamber 199 with the tool 101 is in flush alignment with the tool receiver 200, or the inner receiver 210 thereof. The actuating element 122 is then displaced in the direction of an arrow 167, in the opening 112, from its—in FIG. 1—rear axial end position as far as a—in FIG. 1—front axial end position, in which the slide rod 109 extends through the tool chamber 199 and blocks the tool 101 in the inner receiver 210 of the tool receiver 200. For the purpose of sliding the tool 101 over out of the tool receiver 200 into the tool chamber 199, the actuating element 122 is then displaced back axially, in a direction opposite to the arrow 167, in the opening 112, into its rear axial end position.

It is pointed out, however, that the principle of functioning and the structure of the hand power tool 100 are already known from DE 10 2006 059 688 A1, which, moreover, describes, for example, adjusting means for rotating the tool change magazine 120 about the rotation axis 103, which adjusting means enable the tool chamber 199 to be aligned so as to be flush with the tool receiver 200. In order to simplify the present description, therefore, the latter explicitly includes the disclosure of DE 10 2006 059 688 A1.

Figure 2:
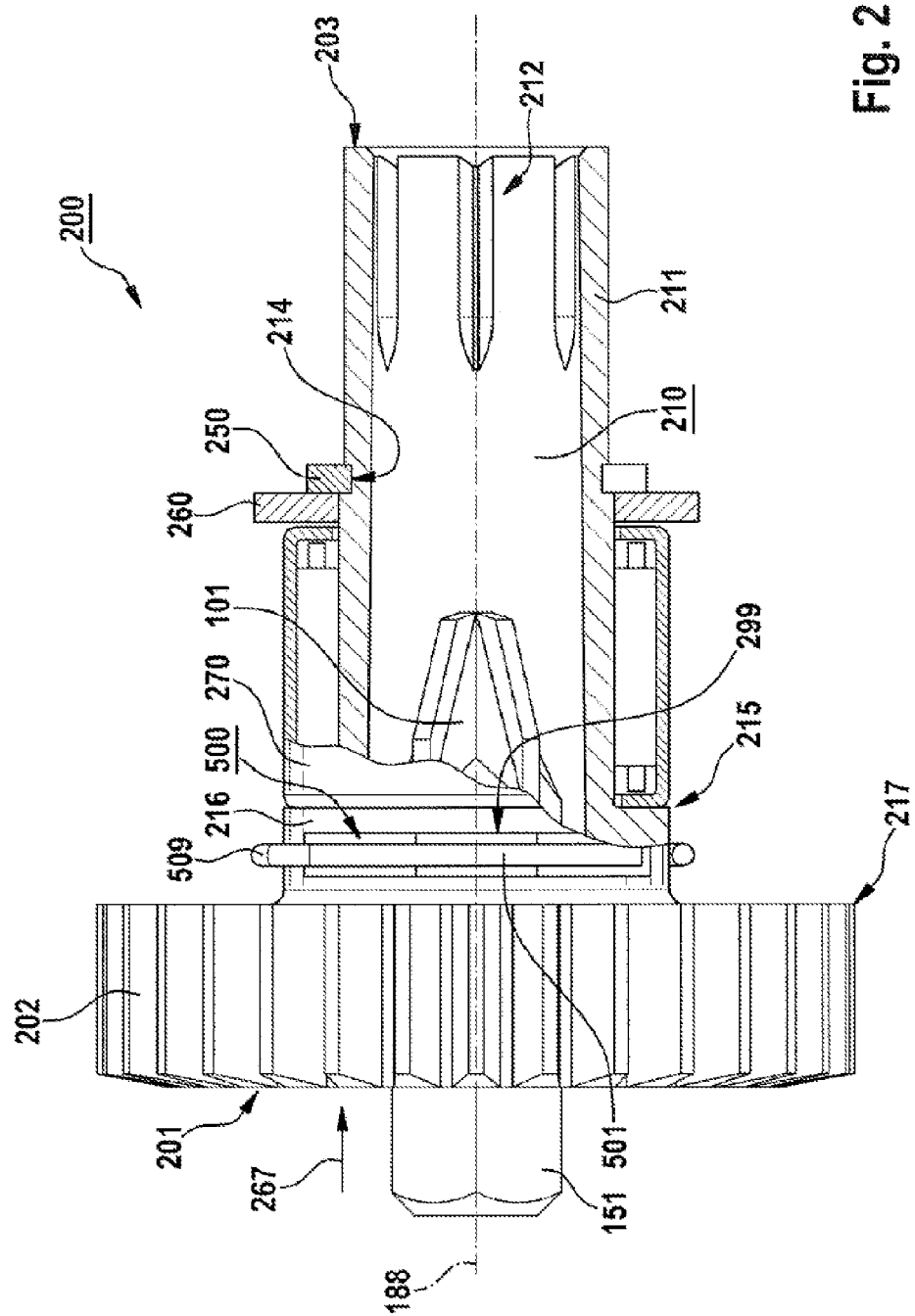
FIG. 2 shows a partially sectional side view of the tool receiver of FIG. 1 with an alignment element according to a first embodiment.

The tool receiver 200 of FIG. 1, which can be rotated about the rotation axis 188 and which is provided with the tool receiver portion 211 in the form of a hollow cylinder, is shown in FIG. 2 in the case of the tool 101 of FIG. 1 being slid over, exemplarily, in the direction of an arrow 267, into the tool receiver 200. By way of illustration, the latter comprises the output toothed wheel 202 of FIG. 1 at a first axial end region 201. A rotary driver profile 212, e.g. an inner polygonal profile, of the inner receiver 210 of FIG. 1 is realized, exemplarily, at an opposite, second axial end region 203, for the purpose of receiving the outer polygonal coupling 151 of the tool 101 in a manner secured against rotation.

By way of illustration, in the region of a first shoulder 217 the tool receiver 200 has a transition from the output toothed wheel 202 to a first reduced-diameter region 216 that, at a second shoulder 215, has a transition to the tool receiver portion 211. By way of illustration, a rolling bearing 270, realized in the manner of a needle bearing, is disposed on the tool receiver portion 211 for the purpose of mounting the tool receiver 200 in a rotationally movable manner in the tool housing 111 of FIG. 1. The rolling bearing 270 is fixed, exemplarily, so as to be axially immovable between the first reduced-diameter region 216 and a blocking disk 260. The blocking disk 260, for its part, is blocked in the axial direction of the tool receiver 200 by a retaining ring 250, e.g. a C-ring, which is fastened in an annular groove 214 realized on the tool receiver portion 211.

According to one embodiment, an alignment element 500, for aligning the outer polygonal coupling 151 of the tool 101 as the tool 101 is slid over, along the longitudinal axis 188 of the tool receiver 200, into the inner receiver 210, is provided in the first reduced-diameter region 216 in order to prevent the outer polygonal coupling 151 from becoming skewed on the rotary driver profile 212, and thus to enable the outer polygonal coupling 151 to be slid into the rotary driver profile 212 of the inner receiver 210. By way of illustration, the alignment element 500 in this case is realized to turn the tool 101, about the longitudinal axis 188, into a rotary position in which the outer polygonal coupling 151 and the rotary driver profile 212 of the inner receiver 210 are disposed in an at least substantially congruent manner, as described below in the case of FIG. 5 and FIG. 6.

According to one embodiment, the alignment element 500 has a spring element 509, which is realized to apply an associated spring force to the outer polygonal coupling 151 of the tool 101 for the purpose of alignment. The spring element 509 is realized, for example, in the manner of a hoop spring, which engages, at least portionally, in at least one radial opening 299 realized in the first reduced-diameter region 216 and assigned to the alignment element 500, in order to access the outer polygonal coupling 151 via this radial opening 299. By way of illustration, the spring element 509 has at least one first spring arm 501, which engages, at least portionally, in the radial opening 299, in order to apply a radially inwardly directed spring force to the outer polygonal coupling 151 in the inner receiver 210 of the tool receiver 200, as described below in the case of FIG. 6.

It is pointed out that, in the case of the rotary position of the tool 101 shown in FIG. 2, if the tool 101 were to be slid over into the tool receiver 200 in an unaligned manner, its outer polygonal coupling 151 would become skewed, for example, on the rotary driver profile 212 of the tool receiver. In order to prevent this, during sliding over the outer polygonal coupling 151 is aligned by the alignment element 500, as described below in the case of FIG. 6.

Figure 3:
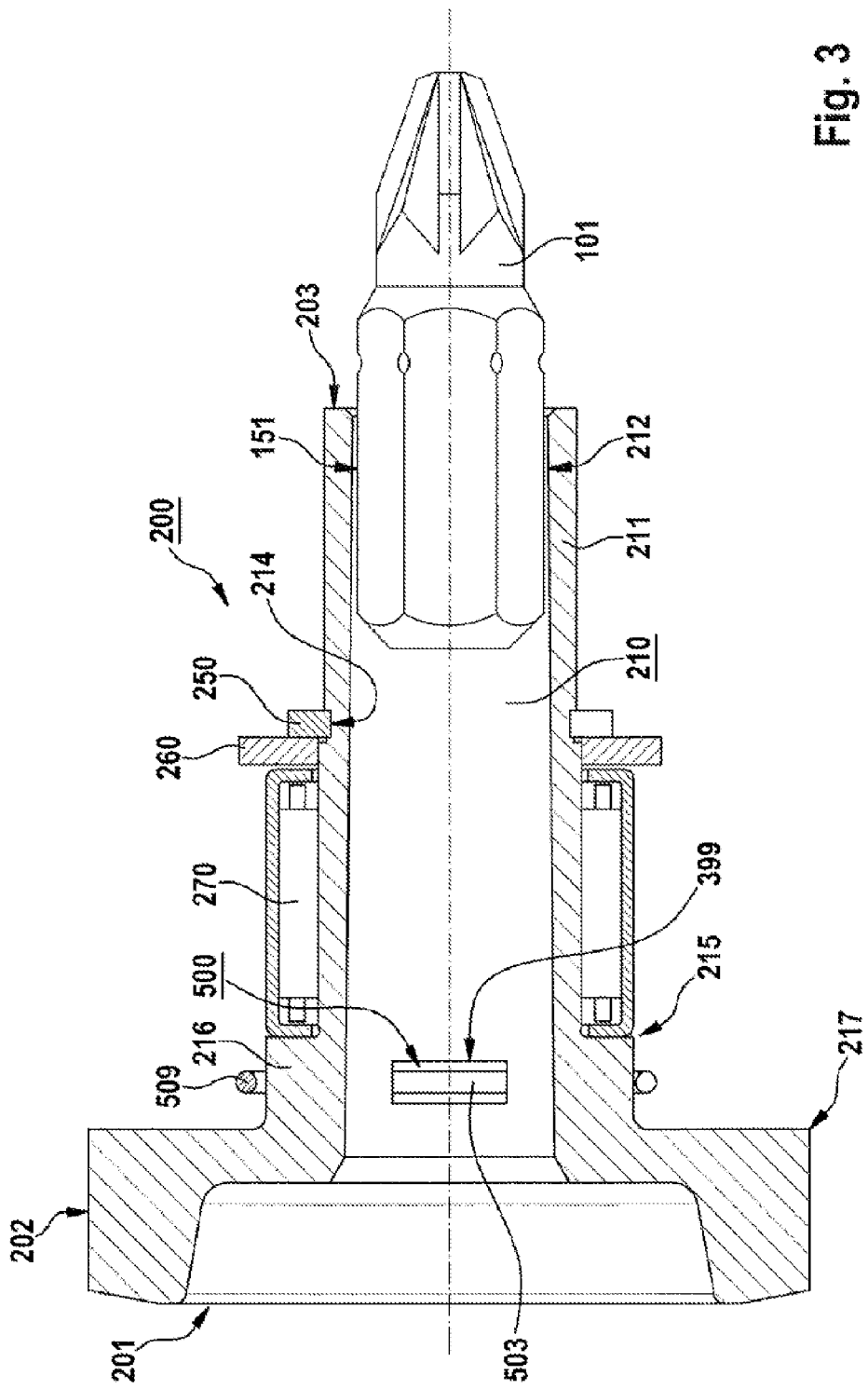
FIG. 3 shows a sectional view of the tool receiver of FIG. 2 with the tool of FIG. 1 disposed therein.

FIG. 3 shows the arrangement of FIG. 2, after the tool 101 has been slid over into the inner receiver 210 of the tool receiver 200, in whose rotary driver profile 212 the outer polygonal coupling 151 is mounted in a manner secured against rotation, when sliding over has been effected. Shown clearly in FIG. 3 is an illustrative, second spring arm 503 of the spring element 509 that engages, exemplarily, in a further radial opening 399 in the first reduced-diameter region 216, which opening is assigned to the alignment element 500 of FIG. 2.

It is pointed out that, according to one embodiment, the radial opening 399 and the radial opening 299 of FIG. 2 are realized in such a way that the spring arms 503 and 501 of FIG. 2 are aligned approximately parallel to each other after corresponding mounting of the spring element 509 on the first reduced-diameter region 216. In other words, after mounting, the longitudinal axes respectively assigned to the spring arms 503 and 501 of FIG. 2 are aligned approximately parallel to each other.

Figure 4:
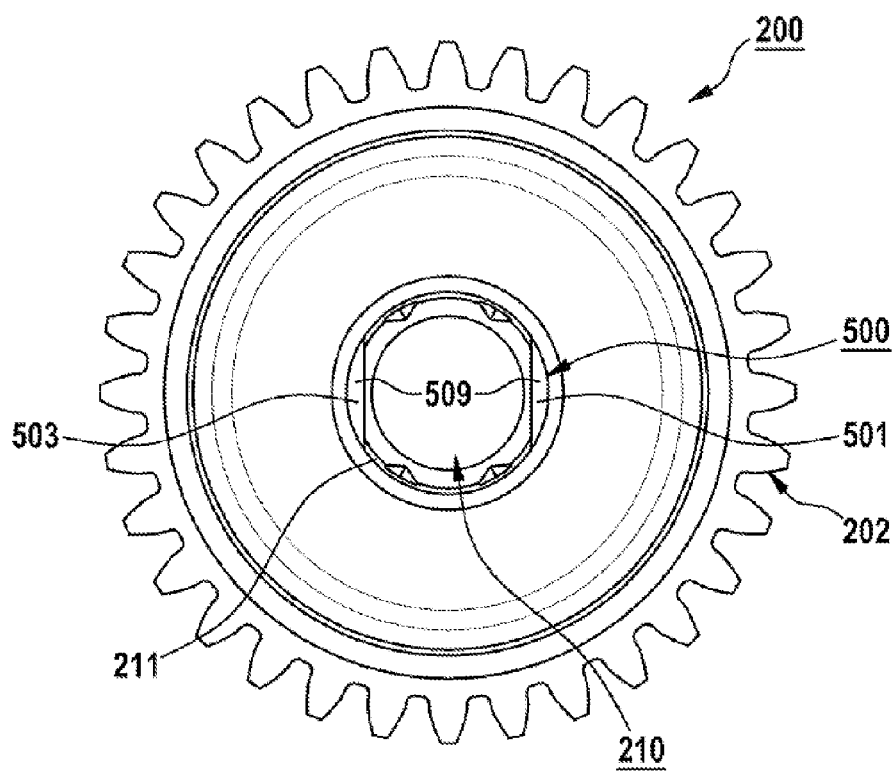
FIG. 4 shows a perspective rear view of the tool receiver of FIGS. 1 to 3.

FIG. 4 shows the tool receiver 200 of FIGS. 2 and 3 with the alignment element 500 of FIGS. 2 and 3. A parallel alignment of the longitudinal axes of the spring arms 501, 503 of the spring element 509 of FIGS. 2 and 3, which extend through the radial openings (299 in FIGS. 2 and 399 in FIG. 3), is shown clearly in FIG. 4.

The outer polygonal coupling 151 of the tool 101 of FIGS. 1 to 3 and the spring element 509 of the alignment element 500 of FIGS. 2 to 4 are shown schematically in FIGS. 5A and 5B, in order to elucidate the functioning of the alignment element 500. As described in the case of FIGS. 2 and 3, the spring element 509 comprises the first and the second spring arm 501, 503, which, according to one embodiment, are connected to each other via a connecting arm 502 realized in the form of a pointed hoop, and which can be bent in mutually opposite directions as a result of an elastic deformation of this connecting arm 502. This connecting arm 502, exemplarily, has an approximately central and, by way of illustration, rounded point 504, which defines a pivot location, or bend location, for the spring arms 501, 503. The spring arm 503, by way of illustration, has a rounded end 505.

Figure 5:
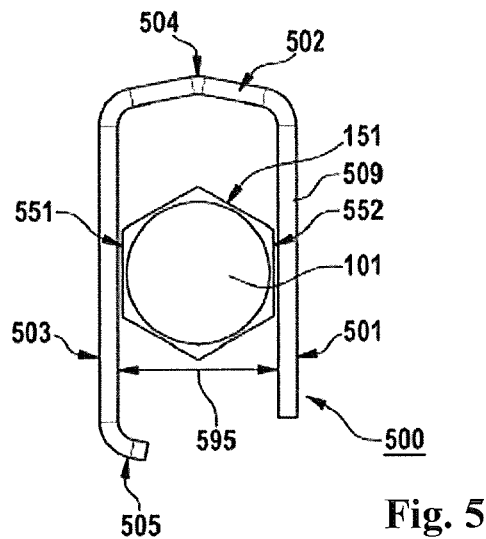
FIG. 5 shows a schematic view with the alignment element of FIGS. 2 to 4 and with the tool of FIGS. 1 to 3 in a neutral state.

FIG. 5 shows the first and the second spring arm 501, 503 of the spring element 509 when the spring element 509 is in the non-bent, or non-deflected, state, which is also referred to in the following as the "neutral state" of the spring element 509. In this neutral state, the spring arms 501, 503 are spaced apart from each other by a spacing, denoted by 595, that corresponds at least to a spacing between two opposing side faces of the outer polygonal coupling 151. By way of example, a first side face of the outer polygonal coupling 151 that is disposed in the region of the spring arm 501 is denoted by 552, and a second side face of the outer polygonal coupling 151 that is disposed in the region of the spring arm 503, diametrically opposite the first side face 552, is denoted by 551.

It is pointed out that the tool 101 in FIG. 5 is shown, exemplarily, in a rotary position in which its outer polygonal coupling 151 has an alignment required for sliding into the rotary driver profile 212 of FIGS. 2 and 3. It is therefore not necessary for the outer polygonal coupling 151 to be aligned. Accordingly, the tool 101 can be slid through the spring element 509—in FIG. 5, into or out of the plane of the page—without the spring arms 501, 503 being able to exert an associated spring force upon the outer polygonal coupling 151 as a result of their spacing 595.

Figure 6:
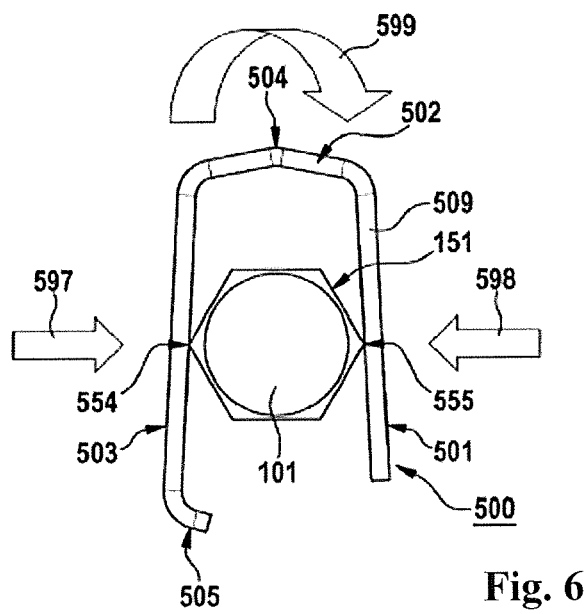
FIG. 6 shows a schematic view with the alignment element of FIGS. 2 to 4 and with the tool of FIGS. 1 to 3 in a bent state.

FIG. 6 shows the arrangement of FIG. 5 when the outer polygonal coupling 151 of the tool 101 is being aligned. This is necessary, according to one embodiment, if the tool 101, when being slid over, has a rotary position other than that of FIG. 5, in which, by way of illustration, two diametrically opposite edges of the outer polygonal coupling 151, which are denoted, exemplarily, by 554, 555, are disposed in the region of the spring arms 503 and 501 respectively. In this case, the spring arms 501, 503 are bent by the outer polygonal coupling 151, about the pivot location or bend location 504, in mutually opposite directions, away from the tool 101, the connecting arm 502 being elastically deformed, such that the spring arm 501 exerts a predefined spring force in the direction of an arrow 598, and the spring arm 503 exerts a predefined spring force in the direction of an arrow 597, upon the outer polygonal coupling 151. These radially inwardly directed spring forces cause the tool 101 to be turned, for example in the direction of an arrow 599, into the rotary position shown in FIG. 5.

What is claimed is:

1. A hand power tool comprising:
a tool having an outer polygonal coupling;
a tool housing including a drum-type tool change magazine having at least one tool chamber configured to store the tool;
a tool receiver arranged on the tool housing and which is configured to receive the tool and which has an inner receiver provided, at least portionally, with a rotary driver profile_corresponding to the outer polygonal coupling, wherein the at least one tool chamber is configured to be aligned so as to be flush with the tool receiver to enable the tool to slide from the at least one tool chamber into the inner receiver or from the inner receiver into the at least one tool chamber; and
an alignment element configured to rotate the tool about a longitudinal axis of the tool to rotationally align the outer polygonal coupling with the rotary driver profile such that the outer polygonal coupling is matingly received on the rotary driver profile as the tool slides from the at least one tool chamber into the inner receiver to enable the outer polygonal coupling to slide into the rotary driver profile of the inner receiver, wherein:

the alignment element has a spring element configured to apply an associated spring force to the outer polygonal coupling, the spring element having at least a first spring arm and a second spring arm connected together via a connecting arm, the connecting arm is elastically deformable to enable at least the first spring arm and second spring arm to be bent in mutually opposite directions, and when the connecting arm is un-deformed, at least the first spring arm and the second spring arm are spaced apart from each other by a spacing that is at least as large as a spacing between two opposing side faces of the outer polygonal coupling.

2. The hand power tool according to claim 1, wherein the spring element applies the spring force in a radially inward direction that is transverse to a longitudinal axis of the tool receiver.

3. The hand power tool according to claim 1, wherein the tool receiver has at least one radial opening formed in the tool receiver in a direction transverse to a longitudinal axis of the tool receiver, in which the spring element at least portionally engages.

4. The hand power tool according to claim 3, wherein the at least one radial opening is configured to enable the spring element to access the outer polygonal coupling.

5. The hand power tool according to claim 3, wherein at least one of the first spring arm and the second spring arm is configured to engage, at least portionally, in the at least one radial opening.

6. The hand power tool according to claim 5, wherein the at least one of the first spring arm and the second spring arm is configured to apply a spring force to the outer polygonal coupling in the inner receiver of the tool receiver in a radially inward direction that is transverse to a longitudinal axis of the tool receiver.

* * * * *